Nov. 27, 1928.  
S. G. CRANE  
1,693,070  
ELECTRICAL CONTROL FOR GAS VALVES  
Filed Feb. 28, 1927   6 Sheets-Sheet 1

INVENTOR  
Samuel G. Crane  
BY  
ATTORNEY.

INVENTOR
Samuel G. Crane
BY Rex Frye.
ATTORNEY.

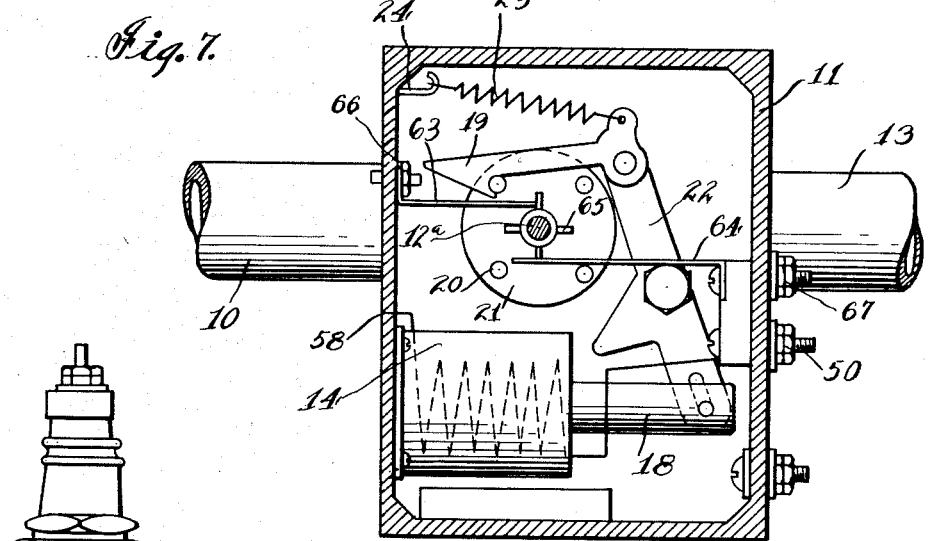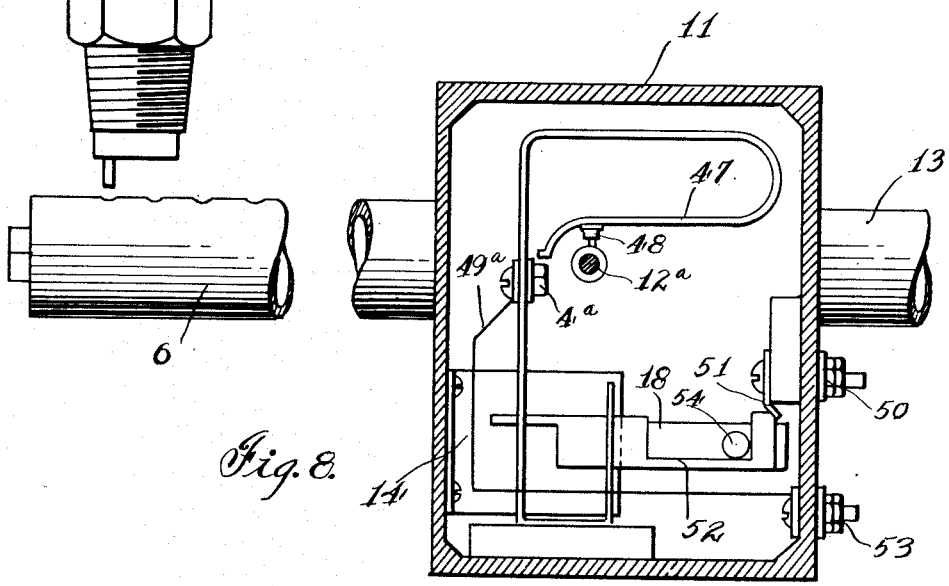

INVENTOR
Samuel G Crane
BY
Rex Frye
ATTORNEY.

Nov. 27, 1928.  
S. G. CRANE  
1,693,070  
ELECTRICAL CONTROL FOR GAS VALVES  
Filed Feb. 28, 1927     6 Sheets-Sheet 5
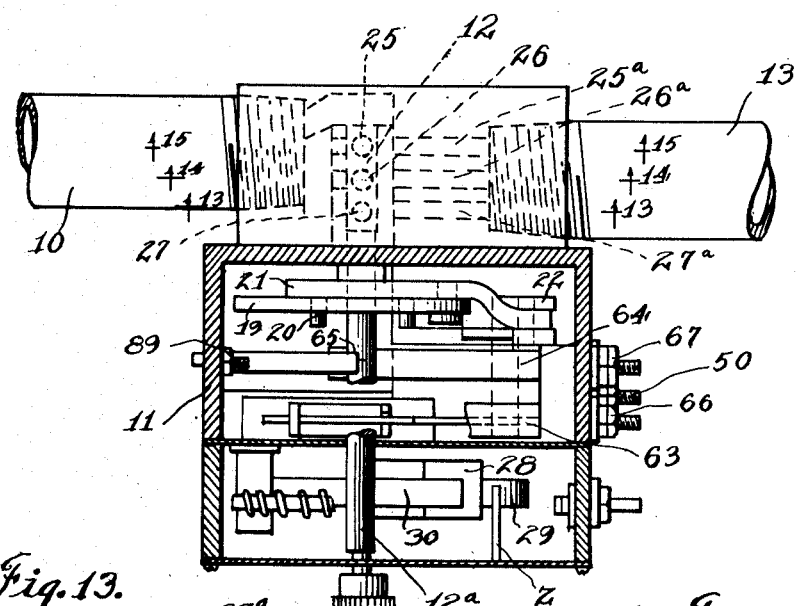
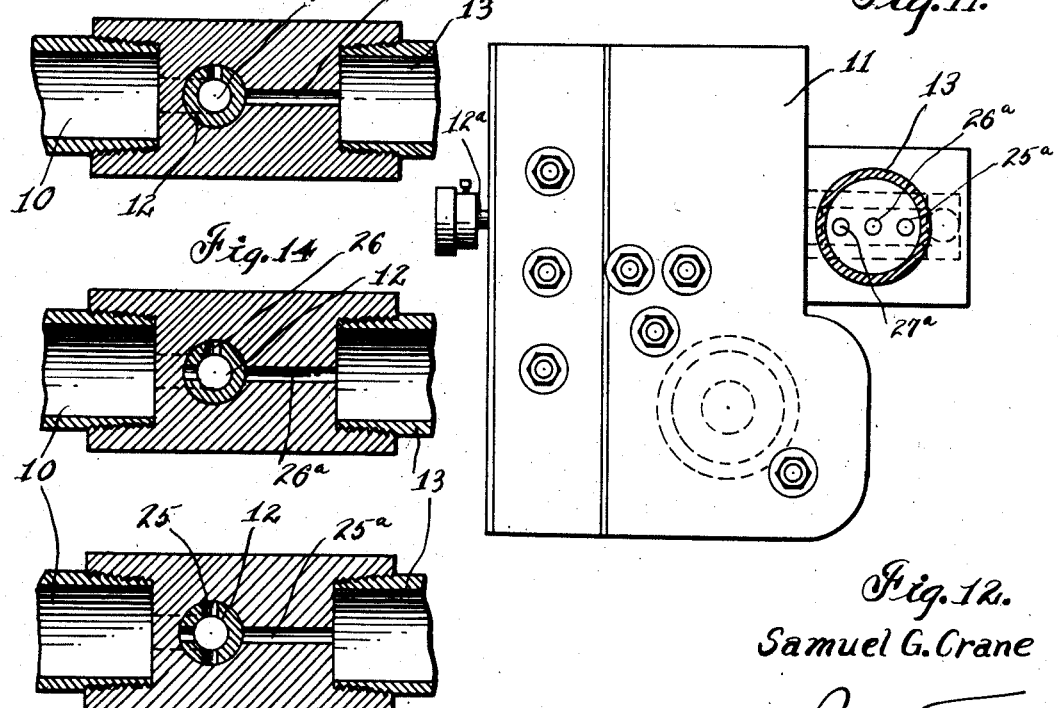
Samuel G. Crane
BY Rex Frye.
ATTORNEY.

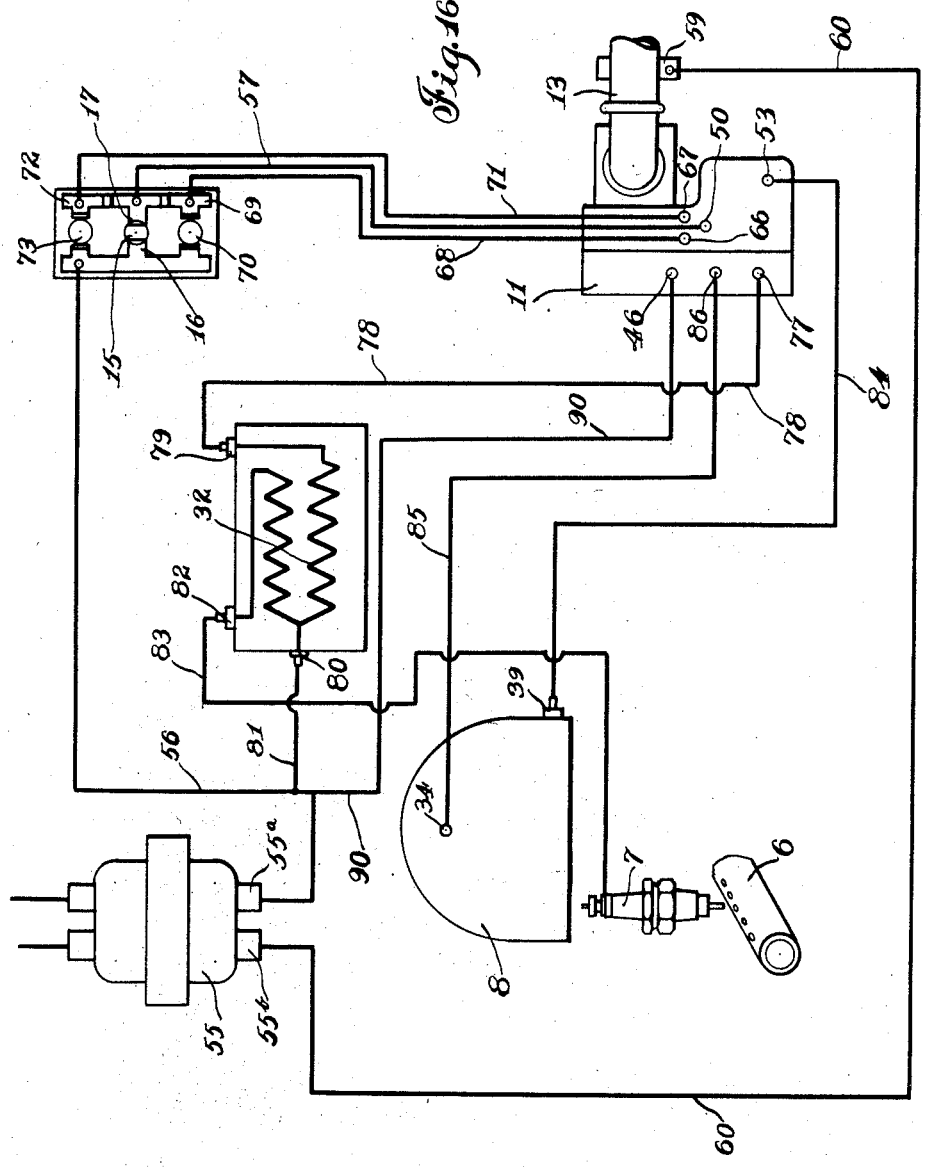

Patented Nov. 27, 1928.

1,693,070

UNITED STATES PATENT OFFICE.

SAMUEL G. CRANE, OF PASADENA, CALIFORNIA, ASSIGNOR TO F. H. OHRMUND, OF PASADENA, CALIFORNIA.

ELECTRICAL CONTROL FOR GAS VALVES.

Application filed February 28, 1927. Serial No. 171,658.

This invention relates to electrical controls for gas valves, and more particularly to that type of control that is adapted to be manually operated from a remote position and also arranged for automatic control of the valve and attendant devices. It is particularly useful in connection with heating devices, such as stoves, furnaces, radiators, water heaters, etc. heated by gas.

One of the objects of my invention is the provision of automatic means for closing the main supply gas valve upon the termination of the electric ignition in the event that no gas flows.

Another object of my invention is the provision of an automatic safety device applicable to gas burners using electric ignition systems whereby the gas valve is automatically turned to closed position in the event of premature cessation of the gas supply or should the gas fail to ignite after the gas valve is opened.

A further object of my invention is the arrangement in connection with the mechanism for automatically closing the valve upon cessation of the gas supply of automatic means for opening the electric circuit after the operation of closing the valve has been performed.

Another object of my invention is the arrangement of electrically actuated means under manual control for opening the gas valve to various positions whereby the amount of gas reaching the burner may be controlled.

Other objects and advantages will be apparent from the following description, wherein reference is made to the accompanying drawings illustrating a preferred embodiment of my invention and wherein similar reference numerals designate similar parts throughout the several views.

In the drawings:

Fig. 7 is a detail front elevation of a rotating three-heat gas valve arranged to be operated by my improved electrical control.

Fig. 8 is a detail front elevation of electrical contact mechanism used in combination with the valve shown in Fig. 7.

Fig. 11 is a plan view of the several mechanisms detailed in Figs. 7, 8, 9 and 10 as they appear when assembled in my improved control device.

Fig. 12 is a side elevation of the gas valve and casing in which the mechanisms shown in Fig. 11 are housed.

Figs. 13, 14 and 15 are enlarged detail vertical sections taken respectively on the lines 13—13, 14—14 and 15—15 of Fig. 11, and Fig. 16 is a diagrammatic view showing the wiring utilized for connecting the several electrically actuated devices used in my improved control.

Figure 1:
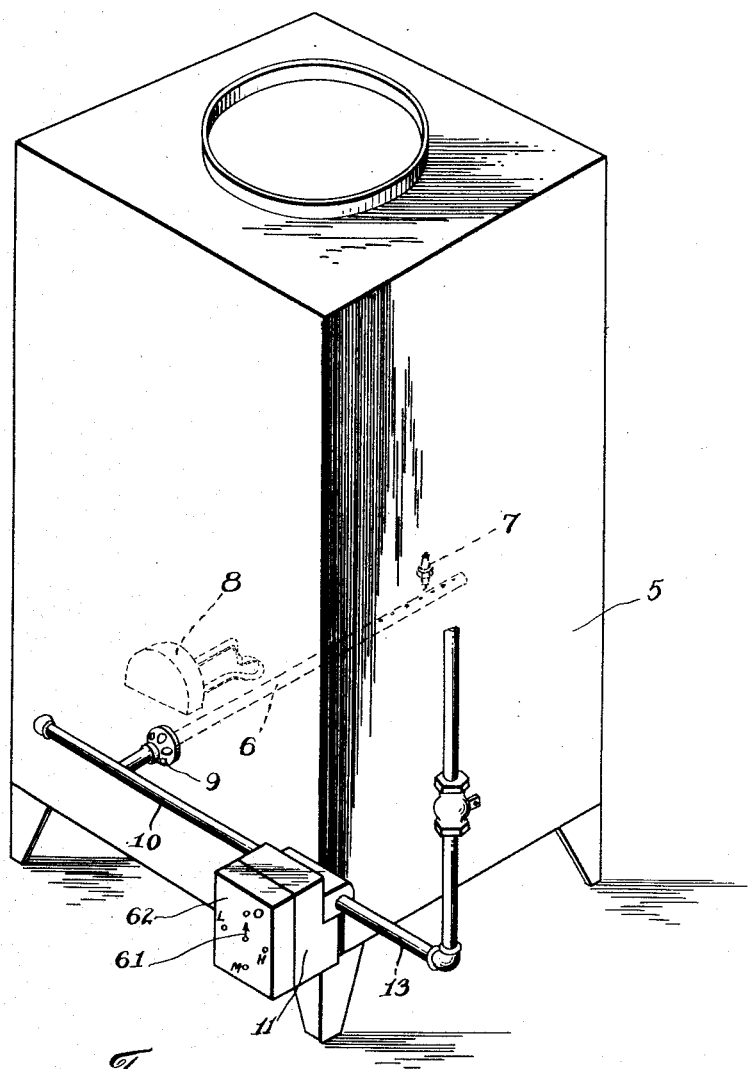
Fig. 1 is a perspective view of a gas heating unit equipped with my improved electrically controlled gas valve.
Figure 2:
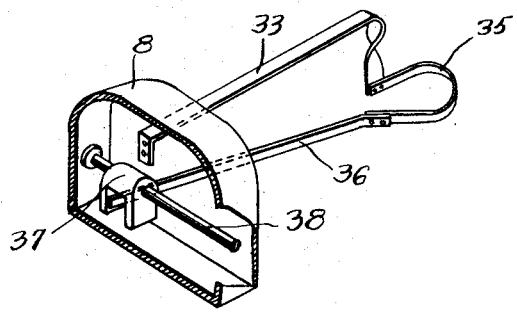
Fig. 2 is a detail perspective view showing the electrical contacting thermostatic mechanism utilized in my improved control in the position assumed while the gas valve is opened, the gas burning and the temperature raised.
Figure 3:
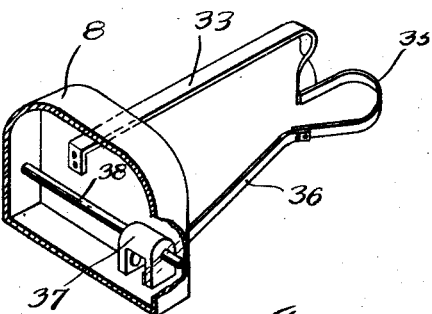
Fig. 3 is a similar view showing the position assumed when the gas valve is closed and the temperature lowered.
Figure 4:
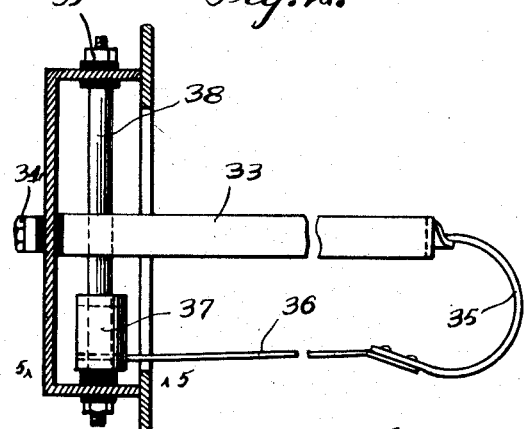
Fig. 4 is a plan view of the device shown in Fig. 3.
Figure 6:
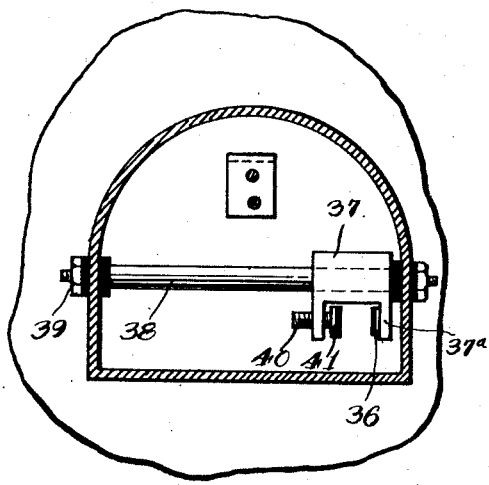
Fig. 6 is a detail cross section taken substantially on the line 6—6 of Fig. 5.
Figure 5:
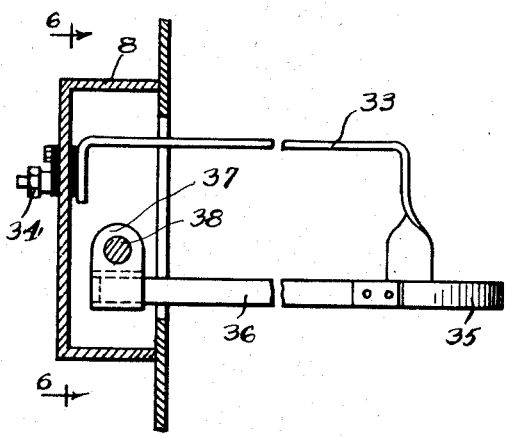
Fig. 5 is a vertical section taken substantially on the line 5—5 of Fig. 4.

Referring now to the drawings, the numeral 5 designates the casing of a gas heating unit surrounding a gas burner 6, spark plug 7, and thermostat 8. This heating unit is merely illustrative of any desired method of utilizing a gas burner for heating purposes, and the heating unit may be that ordinarily used in connection with gas heaters or constructed in any desired manner. One extremity of the gas burner 6 is connected through the air mixer 9 and gas pipe 10 with one side of the automatic valve mechanism housed within the casing 11. Adjacent the other extremity of the gas burner 6 is suitably mounted a spark plug 7, as best illustrated in Fig. 1, the spark plug being suitably connected to ignite the gas flowing from the gas burner, as hereinafter described.

The automatic valve 12 is connected between the gas pipe and the inlet pipe 13 (note Figs. 1 and 11) to control the flow of gas from its source to the burner 6. The automatic valve 12 is preferably of the rotating type and may be partially rotated whenever desired upon the closing of a circuit to energize a solenoid 14, as by pressing a push button 15 into engagement with normally separated plates 16 and 17 suitably connected with the solenoid 14 (note Fig. 16). Whenever the push button switch is closed the solenoid 14 is energized, attracting the armature 18 into the core of the solenoid. As the armature 18 moves toward the solenoid a ratchet 19 (note Fig. 7) is caused to engage one of the pins 20 extending from the disc 21 secured upon the shaft $12^a$ of the rotating valve 12 and move the disc 21 and valve 12 through substantially a quarter revolution, the ratchet 19 being operated through a connecting lever 22, herein shown as fulcrumed intermediate its ends and pivotally connected adjacent its opposite extremities to the armature 18 and ratchet 19 respectively. Whenever the solenoid 14 becomes de-energized the armature 18 is retracted from its position within the solenoid coil, as by means of a coil spring 23, arranged between the ratchet 19 and a hook 24 secured upon the casing 11. During such retracting movement of the armature 18 and connected elements, the ratchet 19 moves away from the pin 20 with which it had just been in contact and passes over the next adjacent pin 20 that had been swung by the rotation of the disc 21 into the position previously occupied by the pin 20 with which the armature 18 had just been in engagement. Preferably the movement of the gas valve 12 through a quarter revolution from its zero or closed position will bring it to its maximum open position, where it permits the passage of gas from the inlet pipe 13 to the gas pipe 10 through three orifices 25, 26 and 27 respectively (note Fig. 11). This arrangement aids in the ready ignition of the gas burner 6, the maximum open position of the valve 12 tending to permit a sudden rush of gas to the burner.

Figure 10:
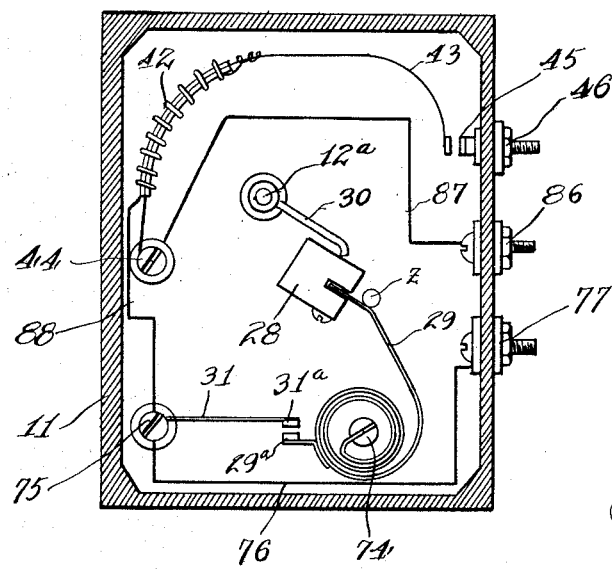
Fig. 10 is a detail front elevation of a timing mechanism used in connection with the valve shown in Fig. 7 and also an electro-thermostatic timing device used in combination with the thermostatic contacting mechanism shown in Figs. 4, 5 and 6.

Simultaneously with the movement of the valve shaft $12^a$ during its first quarter turn, i. e., from its zero or closed position to its maximum open position, a pendulum 28 is set to vibrating, causing an intermittent electrical contact to be made at the points $29^a$ and $31^a$ (note Fig. 10) to thereby cause the spark plug 7 to intermittently function adjacent the burner 6 during the period of oscillation of the pendulum 28. As best shown in Figs. 10 and 11, the pendulum 28 is preferably mounted at one extremity of a coiled spring member 29, and is normally positioned to be engaged by the radial arm 30 carried by the valve shaft $12^a$ when the valve shaft moves from its zero or closed position to its maximum open position. During this quarter revolution of the valve shaft the arm 30 engages the pendulum weight 28 and forces it downwardly against the tension of its spring member 29, then passing beyond the pendulum 28 permits the pendulum to spring back suddenly, thereby setting the pendulum in oscillation. The arm 30 having now passed beyond the pendulum 28 will not again engage the pendulum until it has completed an entire revolution through the intermediate controls for the gas valve back to the zero or closed position of the gas valve. The spring 29 carrying the pendulum weight 28 also carries a projecting contact point $29^a$ (note Fig. 10) normally separated from but adjacent to the contact point $31^a$ carried by the leaf spring 31 electrically connected with the spark coil 32, as hereinafter described. During the period of oscillation of the pendulum 28 the contact points $29^a$ and $31^a$ are intermittently brought into engagement, causing intermittent sparking at the spark plug 7. The period of vibration of the pendulum 28 is adjusted to continue for a time amply sufficient to enable the passage of gas from the inlet pipe 13 through the valve 12, gas pipe 10 and burner 6, where it ignites from the spark generated at the spark plug 7. The pendulum vibrations gradually decrease until they are not sufficient to move the contacts $29^a$ and $31^a$ into engagement with each other, whereupon the spark plug ceases to function.

The gas burner being now lighted and the gas flowing through the valve 12 at its maximum rate of flow, the gas valve may be rotated to curtail the flow of gas to any desired proportion. I have herein illustrated means for moving the gas valve a quarter revolution at each energization of the solenoid 14 by closing its circuit through the push button 15. With the gas valve in position to permit maximum flow of gas, all three of the orifices 25, 26 and 27 in the gas valve are in alignment with the inlet passageways $25^a$, $26^a$ and $27^a$ respectively in the junction box receiving the adjacent extremities of the gas pipes 10 and 13 (note Fig. 11). Whenever the solenoid 14 is next energized the movement of the ratchet 19 will turn the valve 12 through another quarter revolution, moving the orifice 27 in the valve out of alignment with its passageway $27^a$ in the junction box, but permitting gas to flow through the passageways 25ª and 26ª, thereby lessening the supply of gas to the burner. This position may be termed the medium heat position.

When the solenoid 14 is again energized the valve 12 is given another quarter turn, moving the orifice 26 therein out of alignment with its passageway 26ª in the junction box, and permitting gas to flow only through the passageway 25ª, thereby further lessening the supply of gas from the inlet pipe 12 to the burner and leaving gas flowing through only the orifice 25. This position may be termed the low heat position.

When the solenoid 14 is again energized the valve 12 is given another quarter turn, swinging the orifice 25 out of alignment with its passageway 25ª in the junction box, thereby closing all of the orifices in the gas valve 12 and swinging it to its zero or closed position.

Each of the energizations of the solenoid 14 hereinbefore described are obtained by manually operating the push button 15 to close the solenoid circuit. However, in the interest of safety I also provide means for closing the gas valve 12 should at any time the flow of gas to the apparatus be stopped, as through accident to the supply line, or should the combustion of the gas at the burner cease, as on account of low gas pressure, a defective flue, dangerous downdraft, or any other reason.

This electric safety means depends for its operation upon the position of the movable member in the thermostat 8. As best shown in Figs. 2-6 inclusive the thermostat 8 is formed with a bracket 33 secured at one end upon but insulated from the end frame of the thermostat, a binding post 34, however, being electrically connected with the bracket. To the free extremity of the bracket is secured one end of a curved member 35 constructed to move when heated to varying temperatures in the usual manner of thermostats, and the free end of the member 35 is in turn connected with one extremity of the contact arm 36. The free extremity of the contact arm 36 extends between the bifurcations of the slidable U-shaped traveler 37 mounted to slide transversely of the thermostat frame upon the rod 38 in accordance with the expansive and contractive movements of the curved member 35 and contact member 36. The rod 38 is insulated from the frame of the thermostat 8 but is of metal or other suitable material to conduct electricity from the traveler 37 to the binding post 39 formed at one extremity of the rod 38 (note Figs. 4 and 6). One of the bifurcations of the traveler 37 carries an adjustable screw 40 carrying upon its head a piece of insulating material 41 in position to be engaged by the contact arm 36 when it has been sufficiently moved from its normal position by the expansion of the curved member 35. The other bifurcation 37ª of the metallic traveler 37 is not insulated, but instead presents a contact surface to enable passage of current when the contact arm 36 engages such bifurcation. When the contact member 36 is in engagement with this contact surface 37ª a circuit is completed through the thermostat to permit operation of a timing device, hereinafter described, but whenever the contact arm 36 moves away from the contact surface 37ª the current is broken until such time as the contact arm returns into engagement with the contact surface 37ª. The position of the insulated screw 40 with relation to the contact surface 37ª may be arranged to accurately time the closing of the circuit at the contact surface 37ª regardless of the position of the thermostat contact arm 36 or traveler 37 upon the bar 38. This because the expansion of the thermostat moves the free end of the contact arm 36 into engagement with the head of the insulated screw 41 upon a desired increase in heat, and thereafter further heat increases will simultaneously move the free extremity of the contact arm 36 and traveler 37, sliding the traveler to various positions along the rod 38. When, however, the temperature falls, as because of the sudden cessation of the gas supply to the burner 6, the cooling of the thermostatic member 35 will move the free extremity of the contact arm 36 from the insulated screw 40 into engagement with the contact surface 37ª of the traveler, again permitting current to pass to operate the timing device, as hereinafter described. This contact between the contact arm 36 and contact surface 37ª is preferably timed to take place within a few seconds after the cessation of the combustion regardless of the position of the traveler 37 along the rod 38, whether the temperature has been raised to a very high heat or to a relatively low temperature.

Figure 9:
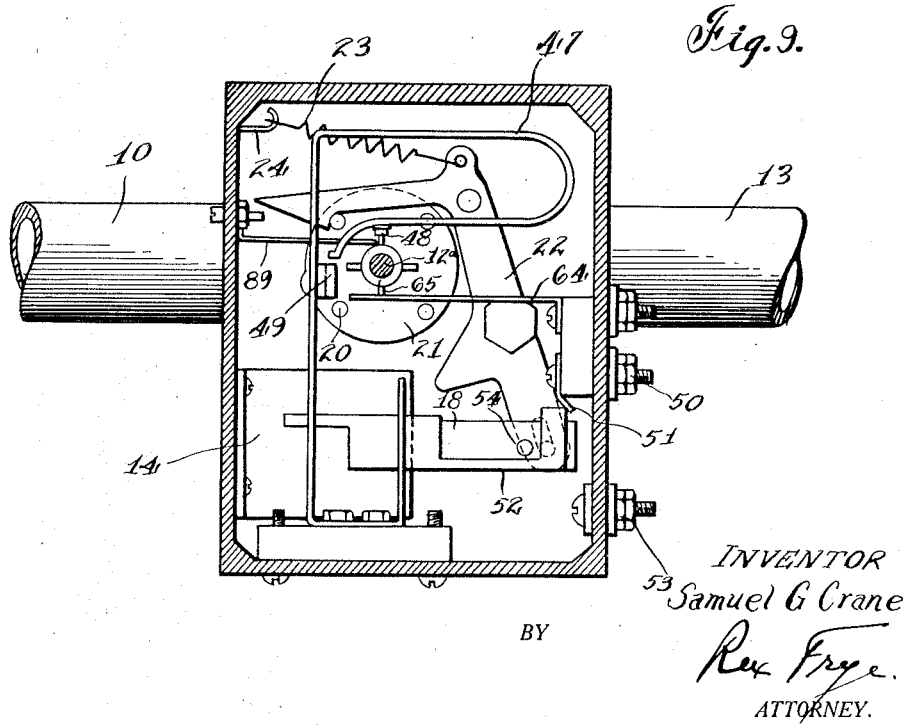
Fig. 9 is a front elevation of the mechanisms shown in Figs. 7 and 8 as they appear when assembled in my improved control device.

Upon the return of the thermostat contact arm 36 into engagement with the contact surface 37ª on the traveler 37, current is permitted to flow through the thermostat to a resistance wire 42 (note Fig. 10) wound around another thermostat 43 located within the casing 11 and preferably fixed at one extremity upon a bolt 44 while its opposite extremity is normally spaced a short distance from a stationary contact member 45 connected with the binding post 46. When the flow of current reaches the resistance wire 42, it causes the thermostat 43 to expand and the expansive movement brings the contact on its free extremity into engagement with the stationary contact 45, thereby closing another circuit, which causes the rotatable gas valve 12 to be brought to its zero or closed position regardless of which heat position it may have been opened to at the time of the cessation of combustion at the burner. This electro-thermostat 42, 43 is used as a timing device, the closing of the circuit at stationary contact 45 taking place a predetermined time after the passage of current to the resistance wire 42. Such resistance wire is energized only when the combustion thermostat arm 36 is in engagement with the contact surface 37ª of the traveler 37, and as it is desirable to have the combustion thermostat 8 break contact quickly upon the first application of heat to the thermostat, it is set ahead of the electro-thermostat 42, 43, whereby the circuit will normally be broken by the separation of the contact arm 36 from the contact surface 37ª of the traveler before the electro-thermostat 43 engages its stationary contact 45. Should, however, the gas fail to ignite at the burner 8 the circuit would not be broken by the separation of the contact arm 36 from the traveler 37, and accordingly, the current would continue to pass to expand the electro-thermostat 43 into engagement with the stationary contact 45 to thereby further energize the solenoid 14 to again partially rotate the gas valve 12, as hereinafter described. This is very important, for if there is no gas flowing in the gas line at the time the valve is opened by the manually operated push button, and later comes on after the ignition mechanism had ceased, or if for any reason the ignition mechanism fails to operate, the gas would continue to flow without combustion until it was discovered later, and asphyxiation or an explosion might result. With my construction, in the event of the non-supply of gas or failure of ignition at the time the valve 12 is opened by the push button circuit, the combustion thermostat 8 adjacent the burner will remain inactive as there will be no heat generated. Accordingly, current will pass through the combustion thermostat to the electro-thermostat timer 42, 43 and cause the movable contact to engage the stationary contact 45, which in turn closes a circuit and causes a current to flow through solenoid 14 and circuit breaker switch 47 (note Fig. 9) causing the valve 12 to make a series of quarter turns until the insulated pin 48 on the valve shaft 12ª is brought into position to cause the circuit breaker switch 47 to be moved upwardly and away from the stationary contact post 49 to maintain the circuit broken until the push button 15 is again manually operated. The insulated pin 48 is positioned on the valve shaft 12ª so that it engages the circuit breaker switch 47 and maintains it away from the stationary contact 49 only when the valve 12 is in its zero or closed position.

Furthermore, the automatic closing circuit just described will function to always find the zero position of the gas valve 12 regardless of whether the valve be opened to high, medium or low heat. The first quarter turn of the valve shaft 12ª opening the valve to high position revolves the insulated pin 48 away from the circuit breaker switch 47 permitting such switch to again engage the stationary binding post 49 to position it to complete the circuit to automatically rotate the valve 12 should it become necessary. However, should combustion take place in the burner 6 the current will not reach the switch member 47 because the circuit will be broken at either the contact arm 36 of the combustion thermostat or at the electro-thermostat 43. When, however, combustion ceases at the burner 6 the current passes as hereinbefore described, through the thermostats to the stationary contact 46, thence to the solenoid 14 to move its armature to further rotate the valve 12 through a quarter turn, as hereinbefore described. This energization of the solenoid 14 is accomplished through the passage of current from the stationary contact 46 to the contact member 50 electrically connected with the stationary plate 51 (note Fig. 9) normally engaged by the slidable switch member 52 whenever the armature of the solenoid 14 is fully retracted from the armature. The slidable switch member 52 moves through the standard of the circuit breaker switch 47, the end of which engages the stationary contact 49 as long as the insulated pin 48 on the valve shaft is away from its zero position. The contact member 49 is in turn electrically connected with the binding post 53, which in turn is electrically connected with the binding post 39 of the combustion thermostat (note Fig. 6). When the solenoid 14 is energized its armature is moved into the solenoid coil, and a pin 54 on the armature moves through a recess in the slidable switch member 52 into engagement with the rear wall of said recess, and the further movement of the armature serves to disengage the slidable member 52 from its stationary contact 51, breaking the circuit to the solenoid. When the circuit is thus broken the spring 23 serves to again retract the core 18 of the solenoid, and in the reverse movement of the solenoid core the slidable switch member 52 is returned to the position shown in Fig. 9, again engaging its stationary contact 51 and closing the circuit to further energize the solenoid 14. These successive energizations of the solenoid 14 continue until the rotation of the valve shaft 12ª brings the insulated pin 48 into engagement with the circuit breaker switch 47, lifting such switch from engagement with the stationary binding post 49 to break the circuit until the valve 12 is again rotated by manual operation of the push button 15.

A more complete conception of the functioning of the several mechanisms and circuits incorporated within this apparatus may be had by reference to the wiring diagram shown in Fig. 16.

The circuit for energizing the solenoid 14 upon manual operation of the push button 15 will first be described. The pressing of the push button bridges the normally separated switch plates 16 and 17 causing a current to flow from the step-down transformer 55 as follows: from one terminal 55ª of the secondary of the transformer through insulated wire 56 to the switch plate 16, thence across to switch plate 17, insulated wire 57 to binding post 50, which is connected as best shown in Fig. 7, with the coil of the solenoid 14. The current then passes through the solenoid coil and passes out through the grounded connection 58 (note Fig. 7) to the casing 11, which is grounded as follows: through pipe 13, ground connection 59 on said pipe and ground wire 60 connected with the ground terminal 55ᵇ of the secondary of the transformer 55. This circuit as it energizes the solenoid coil causes the gas valve to make a quarter turn as hereinbefore described. At each press of the button 15 the valve is rotated a quarter turn, and at each quarter position a signal is arranged adjacent the push button to indicate the degree of heat from the burner, i. e., high, medium or low or that the burner is not ignited. I preferably use red and white lamps to separately indicate low heat and medium heat, and to be simultaneously illuminated to indicate high heat, while the non-illumination of both lamps will indicate that the burner 6 is not ignited. I may also employ an indicator 61 (note Fig. 1) revolving with the valve shaft 12ª and co-operating with a dial 62 bearing suitable insignia, as the initials of low, medium and high, indicating the respective heats of the burner 6.

The lamp circuits are operated as follows: Upon the first quarter turn of the valve shaft 12ª a pair of insulated brushes 63 and 64 respectively (note Fig. 11) are contacted by suitably positioned pins 65 upon the valve shaft, the pins 65 being grounded through the shaft so as to close two lamp circuits as follows: from transformer ground terminal 55ᵇ, grounded wire 60, ground connection 59, pipe 13, casing 11 and valve shaft 12ª, pins 65 to insulated brushes 63 and 64 to binding posts 66 and 67. The binding post 66 of the brush 63 leads through the insulated wire 68 to the switch plate 69 of the red light 70, while the binding post 67 of the brush 64 is connected through the insulated wire 71 with the switch plate 72 of the white lamp 73. The circuits of both lamps are closed through the lamps themselves, the common switch terminal 16 and insulated wire 56 connected with the opposite terminal 55ª of the transformer.

Upon the second quarter revolution of the valve shaft 12ª by the second push of the button 15, the pins 65 are so arranged that only the circuit to the white lamp 73 is in circuit, indicating medium heat; and upon the third quarter revolution of the shaft 12ª because of a third push of the button 15 the pins 65 are so arranged that only the circuit to the red lamp 70 is completed to indicate low heat. At the fourth quarter turn of the shaft 12, i. e., when zero or closed position is again reached, the pins 65 are arranged to contact neither of the brushes 63 or 64. Consequently, neither of the signal lamps 70 or 73 will be illuminated.

Simultaneously with the completion of the solenoid and signal lighting circuits just described a primary and a secondary circuit are started through the induction or spark coil 32, a spark passing after the contacts 29ª and 31ª of the intermittent switch shown in Fig. 10 are brought into engagement. As hereinbefore described this intermittent switch is set in motion for a predetermined length of time when the valve shaft 12ª is turned through the first quarter turn. The primary current flows from the grounded transformer terminal 55ᵇ through ground wire 60, ground connection 59, pipe 13, casing 11 and grounded post 74 of the intermittent switch (note Fig. 10), thence through the contacts 29ª and 31ª, switch plate 31, insulated binding post 75, connecting wire 76 to binding post 77 insulated from but extending beyond the casing 11, thence through the wire 78 to the primary binding post 79 on the spark coil 32. The current then passes through the primary winding of the spark coil and out at the common terminal 80 which is connected by the wire 81 with the wire 56 leading to the opposite terminal 55ª of the transformer. The intermittent contacting of the points 29ª and 31ª sets up an induced current in the secondary winding of the spark coil and causes a high tension current to flow through the secondary terminal 82 of the spark coil and heavily insulated wire 83 to terminal of spark plug 7, thence on through spark plug to spark gap and on to and through the grounded gas burner 6.

These are the normal or manually controlled operations of the mechanism, the first turn of the shaft 12ª serving to open all of the orifices and energize the spark plug 7, thereupon the gas issuing from the burner 6 is fired, causing the temperature to raise so that the contact arm 36 of the combustion thermostat 8 adjacent the burner moves forward away from the contact surface 37ª of the traveler 37, breaking the circuit at this point. The contact arm 36 will remain away from the contact surface 37ª as long as the temperature is raised.

In the event the gas ceases to flow the temperature is lowered adjacent the thermostat 8 and the contact arm 36 resumes contact with the surface 37ª on the traveler 37, causing the circuits that operate the automatic safety or valve closing mechanisms to become energized. Current then passes from the ground terminal 55ᵇ of the transformer through grounded wire 60, ground connection 59, pipe 13, casing 11, solenoid ground connection 58 (note Fig. 7), solenoid coil 14, binding post 50, through stationary contact plate 51, slidable switch plate 52 and circuit breaking switch member 47, the free end of which is in engagement with the stationary binding post 49 at all times except when the valve shaft 12ᵃ is in its zero or closed position (note Fig. 9), thence from the post 49 through wire 49ᵃ (note Fig. 8) to binding post 53, thence through the insulated wire 84 to the insulated terminal 39 at the side of the combustion thermostat 8, through insulated rod 38, traveler member 37, thermostat contact arm 36, thermostat 35, supporting bracket 33 and binding post 34 at the rear of the combustion thermostat (note Fig. 4), then through the insulated wire 85 to the insulated terminal 86, which is connected by the wire 87 (note Fig. 10) with the post 44 to which is fixed one extremity of the electro-thermostat member 43, thence through thermostat 43 to the resistance wire 42, connecting wire 88 leading to the post 75, then through wire 76 to the insulated binding post 77, out through wire 78 to spark plug terminal 79, then through the primary of the spark coil out through the common connection 80 of the spark coil and through the insulated wires 81 and 56 to the opposite transformer terminal 55ᵃ.

The principal object of the last described circuit is to actuate the expansive movement of the electro-thermostat 43 and cause it to act as a timer so that the next circuit which actually causes the valve 12 to close will be retarded for a time sufficient for the contact arm 36 and contact surface 37ᵃ of the combustion thermostat to become positively separated without causing an immediate closing of the valve upon the energization of any of the previously described circuits. When the contact arm 36 and contact surface 37ᵃ remain in engagement, however, the circuit last described directly influences the next automatic or valve closing circuit, for after a sufficient length of time to enable the expansion of the electro-thermostat member 43 to bring its movable contact into engagement with the stationary contact 45 a circuit will be closed to successively move the valve 12 until its zero or closed position is reached, as follows: from ground connection 55ᵇ of the transformer, ground wire 60, grounded connection 59, pipe 13, casing 11, grounded connection 58 of solenoid coil 14, through coil 14, connecting wire to permanent contact plate 51, thence through slidable switch pole 52, circuit breaking switch member 47, switch tension plate 89 (note Fig. 9) and fixed post 49 (as long as the free end of the member 47 is not lifted by the insulated pin 48 on the shaft 12ᵃ), thence through the wire 49ᵃ (note Fig. 8) to binding post 53 and on through insulated wire 84 to the side thermostat terminal 39, through closed combustion thermostat 8 to its rear binding post 34, through insulated wire 85 to binding post 86, thence through wire 87 (note Fig. 10) to the electro-thermostat member 43, through the closed end of this thermostat member and stationary contact 45 to the binding post 46, thence through the insulated wires 90 and 56 back to the opposite terminal 55ᵃ of the transformer 55. This circuit continues to function as long as the insulated pin 48 is away from the flexible free extremity of the circuit breaking switch member 47 (note Fig. 9), and the armature 18 of the solenoid 14 is permitted to reciprocate as previously described until the valve shaft 12ᵃ is rotated to bring the insulated pin 48 into engagement with the circuit breaking member 47 and lift it away from the stationary contact 49, thereby opening the circuit and leaving the valve 12 in its zero or closed position. This system of wiring allows the valve 12 to automatically close from any one of the three positions to which it may be opened upon the cessation of the combustion at the burner 6, or if the valve is manually opened and there is no gas flowing to cause combustion and hence no raise of temperature adjacent the combustion thermostat 8, in which event the contact arm 36 remains in engagement with the contact surface 37ᵃ of the combustion thermostat and the electro-thermostat timer 43 will become heated, close the circuit at 45 and cause the valve to be rotated through quarter revolutions until it is again in its zero position.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention, I claim:

1. In a device of the character described, the combination with a gas burner and gas feed pipe, of a rotatable gas valve mounted between the ends of the feed pipe, means under manual control for partially rotating the gas valve to permit flow of gas to the burner, a spark plug positioned adjacent the burner, and means for causing intermittent sparking at the spark plug for a predetermined time set in operation by the movement of said valve.

2. In a device of the character described, the combination with a gas burner and gas feed pipe, of a rotatable gas valve mounted between the ends of the feed pipe, means under manual control for partially rotating the gas valve to permit flow of gas to the burner, a spark plug positioned abjacent the burner, and means for causing intermittent sparking at the spark plug for a predetermined time set in operation by the movement of said valve from closed position including a vibratory member, and an arm projecting from the valve and adapted to engage and set in motion the vibratory member.

3. In a device of the character described, the combination with a gas burner and gas feed pipe, of a rotatable gas valve mounted between the ends of the feed pipe, means under manual control for partially rotating the gas valve to permit flow of gas to the burner, a spark plug positioned adjacent the burner, and means for causing intermittent sparking at the spark plug for a predetermined time set in operation by the movement of said valve including an ignition circuit including both the spark plug and the burner whereby sparks will jump from the spark plug to the burner.

4. In a device of the character described, the combination with a gas burner and gas feed pipe, of a rotatable gas valve mounted between the ends of the feed pipe, means under manual control for partially rotating the gas valve to permit flow of gas to the burner and upon repetitions of the operation of the manual control to vary the quantity of gas admitted to the burner, means set in motion by the movement of the valve from closed position for igniting gas issuing from the burner, and thermostatically controlled electric means for returning the valve to closed position upon cessation of gas combustion at the burner.

5. In a device of the character described, the combination with a gas burner and gas feed pipe, of a rotatable gas valve mounted between the ends of the feed pipe, means under manual control for partially rotating the gas valve to permit flow of gas to the burner, means initiated by said first-mentioned means for igniting the flowing gas at the burner, and automatic means for returning the valve to closed position upon the cessation of flow of gas to the burner from whatever position the valve then occupied, including a thermostat arranged adjacent the burner and carrying switch members adapted to be separated when the thermostat is heated, and means for regulating the time between extinguishing of the burner and contact of the switch members regardless of the various heats engendered from the burner.

6. In a device of the character described, the combination with a gas burner and gas feed pipe, of a rotatable gas valve mounted between the ends of the feed pipe, means under manual control for partially rotating the gas valve to permit flow of gas to the burner, means initiated by said first-mentioned means for igniting the flowing gas at the burner, and automatic means for returning the valve to closed position upon the cessation of flow of gas to the burner from whatever position the valve then occupied, including a thermostat arranged adjacent the burner and carrying switch members adapted to be separated when the thermostat is heated, and means for maintaining substantially the same time interval between the extinguishing of the burner and contact of the switch members regardless of the various heats engendered from the burner.

7. In a device of the character described, the combination with a gas burner and gas feed pipe, of a rotatable gas valve mounted between the ends of the feed pipe, means under manual control for partially rotating the gas valve to permit flow of gas to the burner and upon repetitions of the operation of the manual control to vary the quantity of gas admitted to the burner, means initiated by said first-mentioned means for igniting the flowing gas at the burner, and thermostatically controlled electric means for returning the valve to closed position whenever the gas burner becomes extinguished, including a combustion thermostat actuated by the heat engendered by the burner and carrying a switch, and an electro-thermostat heated by passage of current when the switch of the combustion thermostat is closed.

8. In a device of the character described, the combination with a gas burner and gas feed pipe, of a rotatable gas valve mounted between the ends of the feed pipe, means under manual control for partially rotating the gas valve to permit flow of gas to the burner and upon repetitions of the operation of the manual control to vary the quantity of gas admitted to the burner, means set in motion by the movement of the valve from closed position for igniting gas issuing from the burner, and electrically actuated means initiated by said first-mentioned means for returning the valve to closed position in the event that gas issuing from the burner fail to ignite, including a pair of thermostat timers each carrying switches in connected circuits.

9. In a device of the character described, the combination with a gas burner and gas feed pipe, of a rotatable gas valve mounted between the ends of the feed pipe, means under manual control for partially rotating the gas valve to permit flow of gas to the burner and upon repetitions of the operation of the manual control to vary the quantity of gas admitted to the burner, means set in motion by the movement of the valve from closed position for igniting gas issuing from the burner, and electrically actuated means initiated by said first-mentioned means for returning the valve to closed position in the event that gas issuing from the burner fail to ignite, including a pair of thermostat timers each carrying switches in connected circuits, one switch being normally closed and adapted to be opened by heat from the burner, and the other thermostatic switch being normally open and adapted to be closed by current passing when the first switch is closed.

10. In a device of the character described, the combination with a gas burner and gas feed pipe, of a rotatable gas valve mounted between the ends of the feed pipe, means under manual control for partially rotating the gas valve to permit flow of gas to the burner and upon repetitions of the operation of the manual control to vary the quantity of gas admitted to the burner, means set in motion by the movement of the valve from closed position for igniting gas issuing from the burner, and electrically actuated means initiated by said first-mentioned means for returning the valve to closed position in the event that gas issuing from the burner fail to ignite, including a pair of thermostat timers each carrying switches in connected circuits, the switch in one of said timers being arranged to break or close the circuit supplying current to the other timer.

In witness whereof I hereunto set my hand.

SAMUEL G. CRANE.